United States Patent
Huang

(10) Patent No.: US 11,642,626 B2
(45) Date of Patent: May 9, 2023

(54) NITROGEN OXIDE ABSORPTION SLURRY AND A PREPARATION AND USE METHOD THEREOF

(71) Applicant: Liwei Huang, Hangzhou (CN)

(72) Inventor: Liwei Huang, Hangzhou (CN)

( * ) Notice: Subject to any disclaimer, the term of this patent is extended or adjusted under 35 U.S.C. 154(b) by 47 days.

(21) Appl. No.: 17/689,331

(22) Filed: Mar. 8, 2022

(65) Prior Publication Data

US 2022/0250004 A1 Aug. 11, 2022

Related U.S. Application Data

(63) Continuation of application No. 17/270,401, filed as application No. PCT/CN2019/114737 on Oct. 31, 2019, now Pat. No. 11,298,654.

(30) Foreign Application Priority Data

Nov. 13, 2018 (CN) .......................... 201811412637.6
Jun. 13, 2019 (CN) .......................... 201910563992.1
Sep. 9, 2019 (CN) .......................... 201910889947.5

(51) Int. Cl.
*B01D 53/56* (2006.01)
*B01D 53/80* (2006.01)
*B01D 53/96* (2006.01)

(52) U.S. Cl.
CPC ............ *B01D 53/80* (2013.01); *B01D 53/56* (2013.01); *B01D 53/96* (2013.01); *B01D 2251/502* (2013.01); *B01D 2251/60* (2013.01)

(58) Field of Classification Search
CPC ........ B01D 53/80; B01D 53/56; B01D 53/96; B01D 2251/502; B01D 2251/60; B01D 2252/60; B01D 2252/602; B01D 2252/10; B01D 2257/404
See application file for complete search history.

(56) References Cited

U.S. PATENT DOCUMENTS

| 3,635,657 A | * | 1/1972 | Bressan | ................ C10K 1/125 423/235 |
|---|---|---|---|---|
| 3,984,522 A | * | 10/1976 | Saito | ...................... B01D 53/56 423/351 |
| 2019/0060829 A1 | * | 2/2019 | Huang | ................ B01D 53/565 |

FOREIGN PATENT DOCUMENTS

| CN | 102527198 | 7/2012 |
|---|---|---|
| CN | 102794098 | 11/2012 |
| CN | 102989301 | 3/2013 |

(Continued)

OTHER PUBLICATIONS

International Search Report and Written Opinion for International Patent Application No. PCT/CN2019/114737 dated Feb. 3, 2020.

*Primary Examiner* — Timothy C Vanoy

(57) ABSTRACT

A nitrogen oxide absorption slurry and its preparation and use method for the removal of nitric oxide in gas streams, belonging to the technical field of air pollution control and related environmental protection, is characterized in that the absorption slurry contains one or more compounds of anhydrous ferric chloride, ferric chloride monohydrate, ferric chloride dihydrate and the complex of ferric chloride and chloride ions. The absorption slurry reacts with the nitric oxide in gas stream at a certain temperature, so that the nitric oxide in the gas stream is absorbed by the slurry, thereby achieving the purpose of gas purification. And the absorbent can be recycled after regeneration.

12 Claims, 1 Drawing Sheet

(56) References Cited

FOREIGN PATENT DOCUMENTS

CN 105 536 501 A * 5/2016 ............. B01D 53/96
EP 0183214 6/1986

* cited by examiner

NITROGEN OXIDE ABSORPTION SLURRY AND A PREPARATION AND USE METHOD THEREOF

CROSS-REFERENCE TO RELATED APPLICATION

This application is a continuation of U.S. Non-Provisional patent application Ser. No. 17/270,401 filed on Feb. 22, 2021. Application Ser. No. 17/270,401 claims priority to PCT Application No. PCT/CN2019/114737 having a filing date of Oct. 31, 2019, based off of CN applications numbered 201811412637.6, 201910563992.1 and 201910889947.5, having a filing date of Nov. 13, 2018, Jun. 13, 2019 and Sep. 9, 2019, respectively, the entire contents of which are hereby incorporated by reference.

FIELD OF TECHNOLOGY

The present disclosure relates to a kind of nitrogen oxide absorption slurry and its preparation and use method thereof, which is used to remove nitric oxide from gas streams, and belongs to the technical field of air pollution control and related environmental protection.

BACKGROUND OF THE INVENTION

Nitrogen oxides ($NO_x$) mainly including nitric oxide (NO) and nitrogen dioxide ($NO_2$), of which NO accounts for more than about 95% of nitrogen oxides produced by fossil fuel combustions, and the concentration is generally from tens $mg/m^3$ to thousands $mg/m^3$.

Nitrogen oxide-containing exhaust gases are also produced from other industrial processes, such as nitric acid production, building materials, metallurgy, chemical, pharmaceuticals, metal surface treatment and semiconductor production. $NO_x$ has a toxic effect on humans, and a large amount of nitrogen oxide emissions is one of the main causes of atmospheric photochemical fog and acid rain.

The applicant of the present invention has disclosed a method (U.S. Pat. No. 10,406,479) for removing nitrogen oxides in a gas stream through a chemical adsorption reaction between ferric chloride and nitric oxide. When solid ferric chloride powders are directly placed in NOx-capturing reactor, the sorbent of solid ferric chloride is easy to be carried away by the gas stream, which may lead to the loss of the sorbent and subsequent secondary treatment. Therefore, in order to overcome the technical problems encountered, the present invention proposes using nitrogen oxide absorption slurry to replace the solid sorbent.

SUMMARY OF THE INVENTION

A nitrogen oxide absorption slurry (absorbent for short, the same below), which is used to remove nitric oxide in gas streams, is characterized in that the mass ratio of water and ferric chloride in the absorbent is from 0.005 to 0.55, and it contains any one or two and more compounds of anhydrous ferric chloride, ferric chloride monohydrate, ferric chloride dihydrate, or a complex of ferric chloride and hydrochloric acid. The less the water content and the more anhydrous ferric chloride crystals in the absorbent, the better the absorption effect on NO removal, and the optimal mass ratio of water to ferric chloride is about 0.01 to 0.11. However, as the water content decreases, the fluidity of the absorbent at the same temperature becomes poor and therefore higher preparation and working temperatures are required to ensure the fluidity of the absorbent. When the mass ratio of water to ferric chloride is less than 0.005, the absorbent cannot be obtained within the temperature range of the invention. When the mass ratio is greater than 0.55, and the slurry does not contain any one or two and more compounds of anhydrous ferric chloride, ferric chloride monohydrate, ferric chloride dihydrate, or the complex of ferric chloride and hydrochloric acid, the absorbent has no absorption effect on nitric oxide removal.

The preparation of the absorbent of the present invention is to mix anhydrous ferric chloride and water, or anhydrous ferric chloride and ferric chloride monohydrate, or anhydrous ferric chloride and ferric chloride dihydrate, or anhydrous ferric chloride and ferric chloride hexahydrate or other ferric chloride containing crystalline water in a mixing reactor according to the mass ratio as described above. After all the materials are fully mixed under a certain temperature and atmosphere, the finally obtained slurry is said absorbent. The obtained slurry can be used directly as a nitric oxide absorbent, and it also can be stored for later use.

The absorbent can also be prepared by dehydrating ferric chloride solutions. The dehydration can be performed by heating or other chemical and physical methods to obtain the absorption slurry of above said mass ratio.

The preparation temperature of the absorbent is generally above 35° C. The higher the preparation temperature, the less water in the prepared absorbent. However, when the preparation temperature is too high, the ferric chloride may undergo hydrolysis to release hydrogen chloride gas, which is negative to the preparation of the absorbent. Therefore, when the absorbent is prepared at a high temperature, it can be performed in a protective atmosphere of hydrogen chloride gas and in a closed environment to prevent decomposition of ferric chloride. The preparation temperature is usually bellow 200° C., preferably 65 to 130° C., but it is not limited to these ranges.

The preparation of the absorbent by using anhydrous ferric chloride and water can be performed as the following steps:

First weigh anhydrous ferric chloride powder and water respectively according to a predetermined ratio (preferably, the mass ratio of ferric chloride to water is 9:1 to 25:1). Then, all the water is added into a closed mixing reactor (the same below), and then anhydrous ferric chloride powder is gradually added, mixed and heated to a predetermined temperature in the presence of inert gas such as air or nitrogen, or in the presence of a protective gas of hydrogen chloride (generally, a protective gas of hydrogen chloride may be used when the preparation temperature is above 60° C., the same below) in the mixing reactor. After ferric chloride and water are completely mixed, the preparation of the absorbent is completed.

The preparation of the absorbent by using anhydrous ferric chloride and ferric chloride hexahydrate can be performed as following steps:

First weigh anhydrous ferric chloride powder and solid ferric chloride hexahydrate respectively according to a predetermined ratio (preferably, the mass ratio of the anhydrous ferric chloride to the ferric chloride hexahydrate is about 3.5:1 to 12:1). And then, all the ferric chloride hexahydrate is added into a mixing reactor, and then anhydrous ferric chloride powder is gradually added, mixed and heated to a predetermined temperature in the presence of inert gas such as air or nitrogen, or in the presence of a protective gas of hydrogen chloride in the mixing reactor. After all materials are completely mixed, the preparation of the absorbent is completed. When other ferric chloride hydrates are used as raw materials, such as monohydrate or dihydrate of ferric chloride, the mass ratio of ferric chloride and other materials can be converted according to the above mentioned proportion.

In the preparation of the absorbent, hydrochloric acid solution can also be used in place of water to increase the content of ferric chloride in the slurry and the fluidity of the slurry. This is because the chloride ions in the hydrochloric acid solution have coordination properties. In addition to the free form of the ferric chloride crystals existing in the slurry, they can also form complexes between ferric chloride and the hydrogen chloride in the hydrochloric acid solution, thereby increasing the content of ferric chloride in the slurry. When the absorbent works, the complex of ferric chloride and hydrogen chloride is decomposed as the hydrogen chloride volatilizes from the slurry, which results in the increase of the content of ferric chloride crystals in the slurry. Therefore the ability of the slurry to continuously absorb nitric oxide is improved. The absorbent may be prepared by mixing solid ferric chloride with hydrochloric acid solution, or it may be also prepared by dehydrating ferric chloride solution after acidification with hydrogen chloride gas or hydrochloric acid.

The content of hydrochloric acid in the absorbent has no special requirements, depending on actual needs. Commercial hydrochloric acid with the concentration of 30 to 38% is usually to be used. The higher the concentration of the hydrochloric acid used, the better the fluidity of the prepared absorbent slurry at the same temperature, and the more ferric chloride in the slurry, the better the nitric oxide removal. Compared with the use of water, the content of ferric chloride (including its complexes) in the absorbent can be at least doubled by using hydrochloric acid solution with the same water content in the absorbent, and is proportional to the concentration of hydrochloric acid in the absorbent. The mass ratio of ferric chloride to water can also reach above 0.99 in the absorbent. Similarly, the higher the preparation temperature, the higher the ferric chloride content in the absorbent. At the same time, the working temperature of the absorbent (the reaction temperature between the absorbent and nitric oxide) is also increased, which is beneficial for removing nitric oxide from gas stream at higher temperatures. Compared with temperature, the concentration of hydrochloric acid has a greater influence on the content of ferric chloride in the absorbent.

The preparation process of the absorbent using hydrochloric acid solution instead of water is substantially the same. The preparation using anhydrous ferric chloride and hydrochloric acid solution can be performed as following steps: First weigh the ferric chloride powder and the hydrochloric acid solution according to a predetermined mass ratio. The mass ratio of the ferric chloride to the hydrochloric acid solution (take 30% hydrochloric acid as an example, the same below) is generally 3 or more. The dose of ferric chloride can be determined according to the concentration of hydrochloric acid and the content of water therein. With the increase of the concentration of hydrochloric acid used, the dose of ferric chloride increases, and the mass ratio of ferric chloride to hydrochloric acid solution is preferably 10 to 100. In the preparation process, the hydrochloric acid solution can be firstly added to a closed mixing reactor, and then anhydrous ferric chloride powder is gradually added, mixed and heated to a predetermined temperature in the presence of inert gas such as air or nitrogen gas, or in the presence of a protective gas of hydrogen chloride in the mixing reactor, and after all materials are completely mixed, the preparation of the absorbent is completed.

The preparation by using ferric chloride hydrates (ferric chloride hexahydrate, for example) and hydrochloric acid solution can be performed as the following steps: First weigh solid ferric chloride hexahydrate and hydrochloric acid solution according to a predetermined mass ratio, and then the hydrochloric acid solution is added to a closed mixing reactor, and then ferric chloride hexahydrate is dissolved in the hydrochloric acid solution, and heated and dehydrated in the presence of a protective gas of hydrogen chloride (hydrogen chloride gas or related mixed gas passed into the solution). After the composition in mixture reaches the predetermined mass ratio, the preparation of the absorbent is completed. Generally, the dehydration temperature is 65° C. or higher, and the higher heating temperature, the faster dehydration process, preferably 110 to 200° C., but it is not limited to this range.

In order to increase the content of ferric chloride crystal in the absorbent, salt solutions which have the properties of salt effect or chloride ion coordination may also be used in place of water in the preparation of the absorbent. Said salts are mainly hydrochloride and sulfate salts of alkali metals, alkaline earth metals or transition metals, and corresponding acid salts, which include sodium chloride, potassium chloride, lithium chloride, calcium chloride, magnesium chloride, zinc chloride, manganese chloride, cobalt chloride, copper chloride, nickel chloride, aluminum chloride, and corresponding sulfates of the metals. In addition, most of the salt solutions are high boiling point salts, which may increase the working temperature of the absorbent by about 10° C. When the salt solution is used to prepare the absorbent, there is no special requirement for the concentration of the salt solution, depending on actual need. The maximum concentration of salt solution is normally the saturation concentration at the working temperature. The other preparation processes are the same as those using hydrochloric acid as solutions. The hydrochloric acid and the salt solutions can also be used together, and the effect together is better than single one.

The method for using the absorbent is to introduce the absorbent into an absorption reactor, and nitric oxide in gas stream is absorbed by chemical reaction with ferric chloride in the absorbent, thereby achieving the purpose of gas purification. The working temperature of the absorbent prepared by mixing water with ferric chloride is 35 to 110° C., preferably 65 to 100° C. . The working temperature of the absorbent prepared by using hydrochloric acid or a salt solution instead of water is 35° C. to 130° C. , preferably 70° C. to 115° C. . The working temperature is roughly equivalent to the temperature of the gas stream being processed. When the concentration of hydrochloric acid or salts in the absorbent is high, the working temperature can be high. When the working temperature is high, a little amount of hydrogen chloride gas may be discharged from the absorption slurry, which may be removed by downstream water or alkali solution absorption.

The major composition of the absorbent responsible for nitric oxide removal are anhydrous ferric chloride crystals, and ferric chloride monohydrate, ferric chloride dihydrate crystals, and ferric chloride hydrochloric acid complex in the absorption slurry may pay a certain absorption effect, and the products of the absorption chemical reaction are coordination compounds or related salts of nitric oxide and ferric chloride. Possible reactions are listed below:

$$FeCl_3 + mNO + nH_2O \rightarrow Fe(H_2O)n(NO)mCl_3 \quad (1)$$

$$FeCl_3 + H_2O + mNO \rightarrow Fe(NO)m(OH)Cl_2 + HCl \quad (2)$$

$$Fe(H_2O)nCl_3 + mNO \rightarrow Fe(H_2O)n(NO)mCl_3 \quad (3)$$

Where, $m+n \leq 6$ (usually $\leq 3$, depending on the reaction conditions).

The mass ratio of the dosage of the absorbent to nitric oxide in the gas stream mainly depends on the content of ferric chloride crystal in the absorbent, and the theoretical molar ratio can be assumed to be 1 (iron to nitrogen ratio). In practical use, the dosage can be determined according to the water content in the absorbent, reaction temperature, removal requirements, and the regeneration cycle. There are no special requirements of the molar ratio, and it is usually from 10 to 1000.

The absorption reactor adopted of the present invention can use gas-liquid contact reactors such as rotating, spraying, bubbling, and moving bed types that are commonly adopted in chemical engineering operations, and the flow pattern in the reactor can be arranged in co-current flow, counter-flow, cross-flow and others. The detailed design parameters can refer to the relevant chemical equipment design manual.

A rotating absorption reactor for nitric oxide absorption includes a horizontally placed rotating reactor column, a gas inlet at one end of the reactor column and a gas outlet at the other end, an absorbent inlet at the upper part of the reactor column and an absorbent outlet at the lower part, and the reactor is driven by a transmission system. The treatment process is to add the absorbent to the reactor through the absorbent inlet, and to introduce the gas stream containing nitric oxide to the reactor from the gas inlet, and to drive the reactor rotating through a transmission system, so that the absorption slurry in the reactor flows along the inner wall of the column of the reactor and makes full contact with the gas stream. Nitric oxide in gas stream is then absorbed by the absorbent, and the purified gas stream is discharged from the gas outlet at the other end of the reactor, and the absorption slurry after absorption can be discharged from the absorbent outlet.

A counter-flow absorption column for nitric oxide absorption includes a column body, a gas inlet at the lower part of the column, and a gas outlet at the upper part of the column. The upper part of the column is provided with an absorbent inlet and a slurry sprayer, and the lower part is provided with an absorbent storage tank. The absorbent storage tank communicates with the absorbent inlet of the column through a slurry circulation pump and a connecting pipe. The saturated absorbent after absorption can be sent to regeneration by a bypass pipe.

The absorbent is still in a slurry state at the working temperature after the absorption reaction with nitric oxide, but it is in a solid state after cooling down to room temperature. When exposed to atmosphere and moisture, the product may be decomposed and release the absorbed nitric oxide gas. The absorbed nitric oxide gas can be removed and recovered as a by-product from the absorbent by heating and/or humidifying. The heating temperature is usually above 65° C., preferably 110° C. to 180° C. The heating temperature under negative pressure or vacuum can be lower, and desorption process is also faster. Both water vapor and hydrogen chloride gas may also be generated during the absorbent-heating process. The absorbent after desorption can be regenerated after dehydration and chlorination (acidification with hydrogen chloride or hydrochloric acid, hereinafter the same), and the regeneration process is substantially the same as the preparation process of the absorbent described above. The regeneration of the absorbent can also be implemented by deliquescing the absorbent in wet air or water vapor or dissolving it in solvents such as water or hydrochloric acid solution to release the absorbed nitric oxide gas, and then by dehydration and chlorination. The dehydration and chlorination can be performed by heating the absorbent under the protection of a hydrogen chloride gas stream, which is substantially the same as the preparation process. The heating temperature is normally above 65° C., preferably 110-200° C., but unlimited. The heating process can also adopt a segmented or programmed heating method according to iron salt (ferric chloride) content in the absorbent. The higher the ferric chloride content, the higher the heating temperature. In addition, the dehydration and chlorination of absorbent can also be performed by using dehydrating agents such as sulfoxide chloride solution. When sulfoxide chloride is used as a dehydrating agent, hydrogen chloride gas is generated in the dehydration, which can also play a chlorinating effect on the absorbent regeneration. The reaction is:

$$SOCl_2 + H_2O \rightarrow 2HCl + SO_2 \qquad (4).$$

Desorption and regeneration of the absorbent can be performed simultaneously. Similar to the preparation of the absorbent, the absorbent is heated and desorbed under the protection of hydrogen chloride gas. Or, with the addition of dehydrating agents such as sulfoxide chloride solution, the absorbent also can be regenerated by simultaneously removing the absorbed nitric oxide and water while the decomposition of iron salt is prevented.

Compared with prior art, this invention uses slurry absorbent to replace the solid ferric chloride particles to absorb and remove the nitric oxide in gas stream. The reactant of ferric chloride in the slurry with the ability to react with nitric oxide can exist in the form of extremely small crystals, which overcomes the low conversion rate of gas-solid reaction and low utilization efficiency of the adsorbent. And furthermore the absorbent prepared by using hydrochloric acid solution or salt solutions to replace water, the content of ferric chloride in the slurry, the working temperature and the ability of the absorbent to continuously absorb nitric oxide are all increased. The absorbent is recycled after regeneration, and the system is simple and easy to operate.

DETAILED DESCRIPTION

Example 1: A preparation method of the absorbent: First weigh the anhydrous ferric chloride powder (industrial grade, net content $\geq 97\%$, the same below), water and ferric chloride hexahydrate (or other ferric chloride hydrates) respectively, according to predetermined mass ratio, and then the water or ferric chloride hexahydrate (or other ferric chloride hydrates) is added to the mixing reactor, and at the same time the temperature of the reactor is raised to a predetermined temperature in the presence of air or nitrogen or protective gas of hydrogen chloride (hydrogen chloride content: about 10-30% by volume, the same below), and then anhydrous ferric chloride powder is gradually added into the reactor, stirred and mixed. After all the materials are completely mixed, the preparation of the absorbent is completed. The mass ratio of materials, preparation temperature and other operating parameters are shown in table 1.

TABLE 1

Operating parameters for the absorbent preparation

| Serial No. | Mass ratio | Temperature (° C.) | Protective gas |
|---|---|---|---|
| 1 | $FeCl_3:H_2O=25:1$ | 100~110 | HCl |
| 2 | $FeCl_3:H_2O=9:1$ | 35~45 | Air |
| 3 | $FeCl_3:FeCl_3 \cdot 6H_2O=12:1$ | 90~100 | $N_2$ |
| 4 | $FeCl_3:FeCl_3 \cdot 6H_2O=8:1$ | 70~80 | $N_2$ |
| 5 | $FeCl_3:FeCl_3 \cdot 6H_2O=3.5:1$ | 45~55 | $N_2$ |
| 6 | $FeCl_3:FeCl_3 \cdot H_2O=1.5:1$ | 85~95 | HCl |
| 7 | $FeCl_3:FeCl_3 \cdot 2H_2O=1:1$ | 60~70 | $N_2$ |

Figure 1:
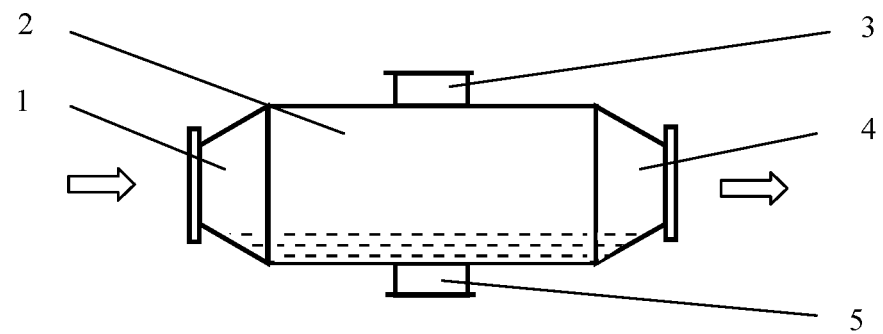
FIG. 1 is a schematic structural view of a rotating absorption reactor according to Example 2 of the present disclosure.

Example 2: A rotating absorption reactor is adopted as the schematic structure shown in FIG. 1.

The reactor includes of a horizontally placed rotating reactor column (2), a gas inlet (1) at one end of the reactor column and a gas outlet (4) at the other end, an absorbent inlet (3) at the upper part of the reactor column and a absorbent outlet (5) at the lower part, and the reactor is driven by a transmission system.

An example Hastelloy made reactor column is 300 mm in diameter, and 1500 mm in length. Two ends of the reactor are conical shaped with a gas inlet and an outlet the inlet of both 150 mm in diameter. The rotation speed of the column is from about 45 to 60 rpm. The gas flow rate of to-be treated gas is about 120 $m^3/h$ (The residence time of the gas in the reactor is about 3 s), and the temperature of the gas stream in the reactor is adjusted from about 35 to 110° C. The gas stream before the inlet is composed of nitric oxide 500 ppm, sulfur dioxide about 300 ppm, carbon dioxide about 10%, oxygen about 8% (by volume, the same below), moisture about 10%, and the balance nitrogen gas. The amount of absorbent added into the reactor is about 30 kg.

The treatment process is to add the absorbent to the reactor through the absorbent inlet (3), and to introduce the gas stream containing nitric oxide to the reactor from the gas inlet (1), and to drive the reactor column (2) rotating through a transmission system, so that the absorption slurry in the reactor flows along the inner wall of the column of the reactor and makes full contact with the gas. NO gas in gas stream is therefore absorbed by chemical reaction with the ferric chloride in the absorbent, and the purified gas stream is discharged from the gas outlet (4) at the other end of the reactor, and the saturated absorbent can be periodically discharged from the absorbent outlet (5). The average removal of nitric oxide for one hour is shown in table 2.

TABLE 2

Effect of absorbent on nitric oxide removal

| Serial No. in Tab.1 | Gas temperature (° C.) | Average NO removal |
|---|---|---|
| 1 | 105~110 | 45 |
| 1 | 95~100 | 60 |
| 1 | 85~90 | 70 |
| 2 | 40~45 | 20 |
| 3 | 100~105 | 55 |
| 3 | 90~95 | 65 |
| 3 | 80~85 | 70 |
| 4 | 65~70 | 65 |
| 5 | 35~40 | 20 |
| 6 | 70~75 | 50 |
| 7 | 50~55 | 15 |

Figure 2:
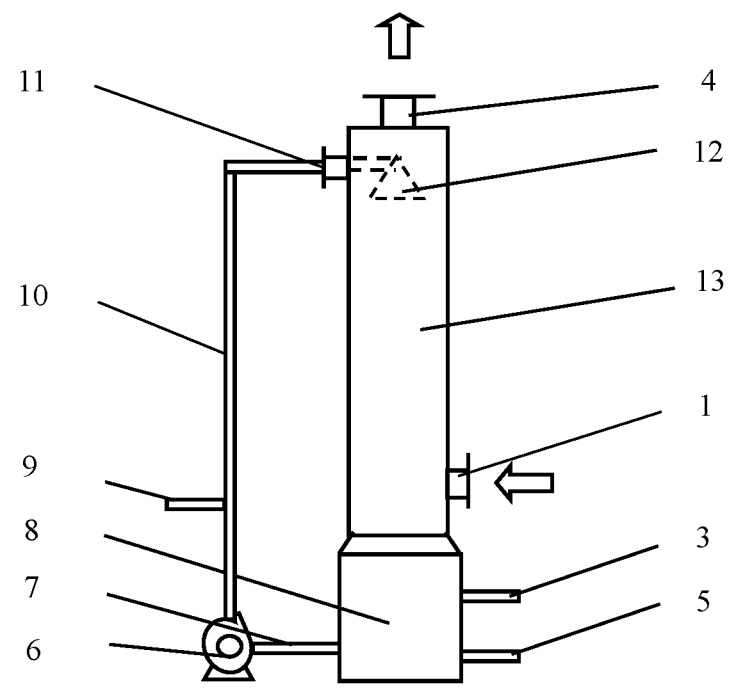
FIG. 2 is a schematic structural view of a scrubbing absorption reactor according to Examples 3, 5 and 8 of the present disclosure.

Example 3: A scrubbing absorption reactor is adopted as the schematic structure shown in FIG. 2. The reactor includes a column body (13), a gas inlet (1) at the lower part of the column, a gas outlet (4) at the upper part of the column. The upper part of the column is provided with an absorbent inlet (11) and a slurry sprayer (12), and the lower part is provided with an absorbent storage tank (8). The absorbent storage tank communicates with a slurry pump (6) though a connecting pipe (7), and the slurry pump communicates with the absorbent inlet (11) through an absorbent supplying pipe (10). The saturated absorbent can be sent to regeneration by a bypass pipe (9).

The scrubbing column is an empty tower, using Hastelloy as the material. The dimension of the absorption column is 300 mm in diameter and 3500 mm in height with an effective spray height of about 2000 mm. The entire pipeline system is heat insulated.

The treatment process is to supply the absorbent to the absorbent inlet of the scrubbing column through a slurry pump, and then the absorbent slurry is sprayed from the top in the column by a slurry sprayer, and the gas stream containing nitric oxide is introduced into the column from the gas inlet. The gas stream is in full contact with the absorbent droplets in the column, and the nitric oxide in the gas stream is absorbed. After reaction, the purified gas stream is discharged from the gas outlet of the reactor, and the absorbent circulates by the pump. The saturated absorbent can be sent to regeneration by a bypass pipe.

The flow rate of gas stream is about 150 $m^3/h$ (the residence time of the gas in the reactor is about 2 s), and the gas composition is the same as in Example 2. The gas temperature of the gas stream in the column is about 80~90° C., and the temperature of absorbent is roughly the same. The absorbent with the serial No. 3 in Tab. 1 is used in the test. The total amount of the absorbent added to the reactor is about 50 kg, and the circulation amount by the absorbent pump is about 350 kg/h. The maximum average removal of nitrogen oxides for one hour is about 75%.

Example 4: A preparation method of the absorbent by mixing anhydrous ferric chloride powder with a hydrochloric acid solution with different concentrations: The preparation process is to add a hydrochloric acid solution to a mixing reactor, and then gradually add the ferric chloride powder, stirred and mixed. The reactor temperature is from room temperature to 120° C., and when the reactor temperature is higher than 60° C., the protective gas of hydrogen chloride (10-30% hydrogen chloride in nitrogen gas) is introduced into the reactor. After all the materials are completely mixed, the preparation of the absorbent is completed. The mass ratio of materials, preparation temperature and other operating parameters are shown in table 3.

TABLE 3

Mass ratio and operating parameters for the absorbent preparation

| Serial No. | HCl Con. (%) | Mass ratio of $FeCl_3$:HCl | Temperature (° C.) | Protection gas |
|---|---|---|---|---|
| 8 | 0 | 15 | 70~75 | $N_2$ |
| 9 | 5 | 20 | 75~80 | HCl |
| 10 | 10 | 35 | 80~85 | HCl |
| 11 | 20 | 45 | 90~95 | HCl |
| 12 | 30 | 70 | 100~105 | HCl |
| 13 | 34 | 80 | 85~90 | HCl |
| 14 | 36 | 50 | 35~40 | $N_2$ |
| 15 | 36 | 100 | 115~120 | HCl |

Example 5: The reactor shown in FIG. 2 was adopted. The temperature of the gas stream in the absorption column ranges from about 65 to 120° C., and other conditions are the same as in example 3. The maximum average removal of nitrogen oxide for one hour is shown in table 4.

TABLE 4

Effect of absorbent on nitric oxide removal

| Serial No. | Gas temperature (° C.) | Average NO removal (%) |
|---|---|---|
| 8 | 70~75 | 50 |
| 8 | 80~85 | 35 |
| 9 | 75~80 | 60 |
| 10 | 100~105 | 65 |
| 11 | 90~95 | 70 |
| 11 | 115~120 | 40 |
| 11 | 120~125 | 25 |
| 12 | 90~95 | 75 |
| 13 | 95~100 | 80 |
| 14 | 80~85 | 75 |
| 14 | 100~105 | 65 |
| 15 | 125~130 | 20 |

Example 6: A preparation method of the absorbent: 30 parts of solid ferric chloride hexahydrate and 1 part of 36~38% hydrochloric acid solution are weighed according to the mass ratio. The prepared hydrochloric acid solution is first added to a mixing reactor, and then ferric chloride hexahydrate is added gradually to the reactor, stirred and mixed (the temperature of the reactor may be raised to about 50~60° C.). After all the added solid ferric chloride hexahydrate is completely dissolved, the temperature of the reactor is increased to about 150~180° C. for dehydration in the presence of a mixed gas of nitrogen and hydrogen chloride (Hydrogen chloride gas about 30~50% in volume). When the water content in the liquid phase decreased to about 4~5% the weight of the material, the preparation of the absorbent is completed.

Example 7: A preparation method of the absorbent: The absorbent is prepared by mixing anhydrous ferric chloride with different salt solutions. The preparation is to add a predetermined amount of water and solid salt to a mixing reactor. After the salt is completely dissolved, ferric chloride powder of a predetermined quality is then gradually added, And the other process is the same as that in above examples. After the ferric chloride and the salt solution are sufficiently mixed, the preparation of the absorbent is completed. The mass ratio of materials and operating parameters are shown in table 5.

TABLE 5

Mass ratio of materials and operating parameters

| Serial No. | Salt solution | Mass ratio of FeCl$_3$:salt solution | Temperature (° C.) | Protection gas |
|---|---|---|---|---|
| 16 | 5% NaCl | 30 | 65~70 | N$_2$ |
| 17 | 25% NaCl | 40 | 80~85 | HCl |
| 18 | 30% KCl | 45 | 90~95 | HCl |
| 19 | 40% CaCl$_2$ | 40 | 120~130 | HCl |
| 20 | 15% MgCl$_2$ | 35 | 95~100 | HCl |
| 21 | 30% MgCl$_2$ | 40 | 110~115 | HCl |
| 22 | 35% MnCl$_2$ | 40 | 115~120 | HCl |
| 23 | 15% Na$_2$SO$_4$ | 35 | 60~65 | N$_2$ |
| 24 | 35% ZnSO$_4$ | 40 | 100~105 | HCl |
| 25 | 35% CuSO$_4$ | 40 | 95~100 | HCl |
| 26 | 15% NaCl + 10% HCl | 40 | 95~100 | HCl |
| 27 | 15% Na$_2$SO$_4$ + 10% HCl | 40 | 95~100 | HCl |
| 28 | 30% AlCl$_3$ + 20% HCl | 50 | 90~95 | HCl |
| 29 | 60% ZnCl$_2$ + 20% HCl | 45 | 95~100 | HCl |

Example 8: The reactor shown in FIG. 2 was adopted. The temperature of the gas stream in the absorption column is from about 65 to 130° C. , and other conditions are the same as in example 3. The average removal of nitric oxide for one hour is shown in table 6.

Table 6 Effect of Absorbent on Nitric Oxide Removal

| Serial No. in Tab. 5 | Gas temperature (° C.) | Average NO removal (%) |
|---|---|---|
| 16 | 70~75 | 55 |
| 17 | 80~85 | 75 |
| 18 | 75~80 | 85 |
| 19 | 100~105 | 65 |
| 20 | 90~95 | 70 |
| 21 | 115~120 | 45 |
| 22 | 120~125 | 40 |
| 23 | 65~70 | 60 |
| 24 | 100~105 | 65 |
| 25 | 125~130 | 25 |
| 26 | 85~90 | 80 |
| 27 | 70~75 | 65 |
| 28 | 90~95 | 70 |
| 29 | 100~105 | 75 |

Example 9: A method for regenerating the absorbent: The reacted absorbent of serial No. 4 used in example 2 is introduced to a regeneration reactor (the same as the mixing reactor for absorbent preparation, the same below), and then a 20% hydrochloric acid solution with an amount of about 0.1 to 0.3 of the volume of the absorbent is added to the reactor after evacuating the air in the reactor, stirred and mixed, and then the reactor is heated to the temperature of about 90 to 110° C. for a period of maintaining. The nitric oxide gas released from absorbent is recovered during the above process. After the release of nitric oxide is completed, a mixed gas of nitrogen and hydrogen chloride is introduced below the liquid surface in the reactor, and the same time, the temperature of the reactor is raised to about 120~150° C. for dehydration. When the water content in liquid phase decreases to about 5~7% (mass), the regeneration of the absorbent is completed.

Example 10: A method for regenerating the absorbent: The reacted absorbent of serial No. 10 used in example 5 is added to a regeneration reactor. After the air in the reactor is evacuated, the reactor is heated to the temperature of about 150 to 160° C. for a period of maintaining, and at the same time, the nitric oxide gas released from absorbent is recovered. After the release of nitric oxide is completed, a mixed gas of nitrogen and hydrogen chloride is introduced below the liquid surface in the reactor for chlorination and dehydration. When the water content in the liquid phase decreases to 3~5% (mass), the temperature of the reactor is adjusted to 100~110° C., and lasts for a period of time, before completing the regeneration of the absorbent.

Example 11: A method for regenerating the absorbent: The reacted absorbent of serial No. 17 used in example 8 is added to a regeneration reactor, and then 20% hydrochloric acid solution with an amount of about 0.1 to 0.3 of the volume of the absorbent is added to the reactor after evacuating the air in the reactor, stirred and mixed, and then the reactor is heated to the temperature of about 100~110° C. for a period of maintaining. The nitric oxide gas released from absorbent is recovered during above process. After the release of nitric oxide is completed, a mixed gas of nitrogen and hydrogen chloride is introduced below the liquid surface in the reactor, and at the same time, the temperature of the reactor is raised to about 160~180° C. for dehydration. When the water content in liquid phase decreases to about 3-5% (mass), the regeneration of the absorbent is completed.

Example 12: A method for regenerating the absorbent: The absorbent after the reaction with the serial No. 11 used in example 5 was added to the regeneration reactor. After the air was evacuated, the temperature of the reactor was maintained the temperature of 95~100° C., and then sulfoxide chloride liquid was slowly added by dropping to the reactor for dehydration and chlorination, stirring to make the absorbent slurry in the reactor fully contacted with the sulfoxide chloride liquid. The vaporized sulfoxide chloride in the reactor is returned to the reactor by a condensation reflux, and water vapor, nitric oxide, hydrogen chloride and sulfur dioxide generated during the reaction process are discharged through the non-condensable gas outlet of the condensation reflux for further treatment. The total dosage of sulfoxide chloride added to the reactor is about 6~10 times the water removed from absorbent. When the water content in liquid phase decreases to about 2-3% (mass), the regeneration of the absorbent is completed.

The invention claimed is:

1. A nitrogen oxide absorption slurry for removing nitric oxide gas from gas streams, wherein said absorption slurry contains any one or two and more compounds of anhydrous ferric chloride, ferric chloride monohydrate, ferric chloride dihydrate, and a complex of ferric chloride and hydrochloric acid.

2. The preparation method of the absorption slurry according to claim 1, wherein the absorption slurry is prepared by mixing anhydrous ferric chloride and water, or anhydrous ferric chloride and hydrochloric acid, or anhydrous ferric chloride and ferric chloride monohydrate, or anhydrous ferric chloride and ferric chloride dihydrate, or anhydrous ferric chloride and ferric chloride hexahydrate, or anhydrous ferric chloride and ferric chloride monohydrate and hydrochloric acid, or anhydrous ferric chloride and ferric chloride dihydrate and hydrochloric acid, or anhydrous ferric chloride and ferric chloride hexahydrate and hydrochloric acid, respectively, according to said mass ratio under a certain temperature and atmosphere.

3. The preparation method of the absorption slurry according to claim 2, wherein said temperature for preparing the absorbent slurry is 35° C. and above, and said atmosphere is in the presence of air, nitrogen gas or hydrogen chloride gas.

4. The preparation method of the absorption slurry according to claim 1, wherein the absorption slurry is prepared by the dehydration of the ferric chloride solution, or by the dehydration of the mixture of ferric chloride and hydrochloric acid, under a certain temperature and atmosphere.

5. The preparation method of the absorption slurry according to claim 4, wherein said temperature for preparing the absorbent slurry is 65° C. and above, and said atmosphere is in the presence of air, nitrogen gas or hydrogen chloride gas.

6. The preparation method of the absorption slurry according to claim 2, wherein said water can be replaced by a salt solution or a mixture of salt and hydrochloric acid solution, and said salt can be a chloride or sulfate of alkali metal, alkaline earth metal or transition metal, which includes sodium chloride, potassium chloride, lithium chloride, calcium chloride, magnesium chloride, zinc chloride, manganese chloride, cobalt chloride, copper chloride, nickel chloride, aluminum chloride, and the corresponding sulfates.

7. The use method of the absorption slurry according to claim 1, wherein the absorption slurry is introduced into a nitrogen oxide absorption reactor and nitric oxide in gas stream is absorbed by chemical reaction with ferric chloride in the absorbent at a certain temperature.

8. The use method of the absorption slurry according to claim 7, wherein the nitrogen oxide absorption reactor can be a rotating, spraying, bubbling or moving bed type gas-liquid contact reactors, and the flow pattern in the reactor can be used arranged in co-current flow, counter flow and cross flow.

9. The use method of the absorption slurry according to claim 7, wherein the reaction temperature of the absorbent prepared by water and ferric chloride is from 35 to 110° C., and is from 35° C. to 130° C. prepared by hydrochloric acid and/or salt solution instead of water.

10. The regeneration method of the absorption slurry according to claim 1, wherein the regeneration of the absorbent can be implemented by heating or humidifying, or dissolving in water or hydrochloric acid solution to release the absorbed nitric oxide gas from the absorbent, and then followed by dehydration and chlorination process, where the desorption of nitric oxide gas from the absorbent, dehydration and chlorination can be performed simultaneously, and the temperature of said heating is 65° C. and above.

11. The regeneration method of the absorption slurry according to claim 10, wherein the dehydration and chlorination are carried out in the presence of hydrogen chloride gas.

12. The regeneration method of the absorption slurry according to claim 10, wherein the dehydration and chlorination can be carried out by adding sulfoxide chloride solution.

* * * * *